June 19, 1962 A. D. LARISCY 3,039,452
PLUMBERS' LEAD MELTING FURNACE
Filed April 7, 1961

INVENTOR
ALEC D. LARISCY

BY *Roy E. Raney*
ATTORNEY

United States Patent Office 3,039,452
Patented June 19, 1962

3,039,452
PLUMBERS' LEAD MELTING FURNACE
Alec D. Lariscy, Tampa, Fla., assignor to Wagner Products Corporation, St. Petersburg, Fla., a corporation of Florida
Filed Apr. 7, 1961, Ser. No. 101,569
1 Claim. (Cl. 126—240)

This invention relates to an improved portable, gas fired furnace or apparatus for melting plumbers' lead, which apparatus is quiet and efficient in operation, and which maintains the lead in a usable molten state with a minimum of oxidation thereof.

It is one important object of this invention to provide a lead melting furnace wherein a melting pot, preferably of iron, is heated evenly over substantially the entire outer surface thereof by absorption of infra-red energy and without actual contact by flame whereby the pot is free of the hot spots heretofore created by blow torch type furnaces of the prior art, which hot spots not anly damage the pot but cause boiling of the lead bringing about increased contact thereof with air and hence wasteful oxidation of the lead.

As another object this invention aims to provide a lead melting furnace which is substantially silent in operation in contrast to the mentioned blow torch type apparatus of the prior art, and which consumes considerably less fuel under equal operating conditions.

A more specific object of the present invention is the provision of apparatus of the above described character wherein a melting pot is supported by a metal shroud engaging the marginal edge thereof and holding the pot in spaced relation to an infra-red energy developing gas burner in which combustion if effected partially within the passages of a foraminous refractory element and is completed with a mere fraction of the space between the burner and the pot, so that the pot is free from direct contact with the flame and is heated evenly over the entire outer surface thereof by infra-red emanations from the refractory element, the shroud having substantially gas tight connection with the burner and with the marginal edge of the pot and having a series of restricted openings through which burned gases escape, the openings being of such a size as to maintain a back-pressure within the shroud whereby the hot, burned gases aid in the even distribution of heat over the surface of the pot.

Other objects and advantages of the invention will be apparent from the following detailed description of a preferred embodiment thereof together with the accompanying sheet of drawings forming a part of this specification, and in which.

Figure 1:
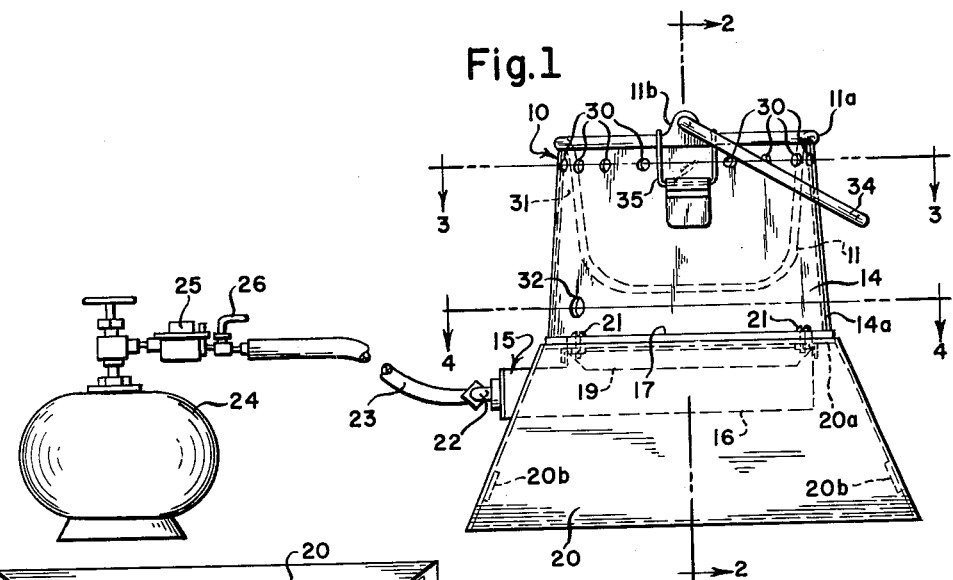
FIG. 1 is an elevational view of lead melting furnace embodying the present invention.
Figure 4:
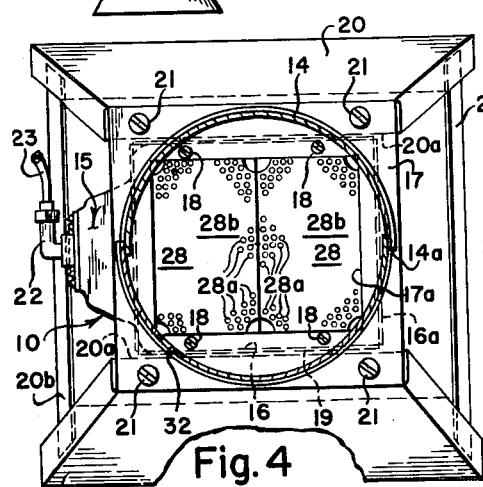
FIG. 4 is a horizontal sectional view taken along line 4—4 of FIG. 1.

In the form of the invention illustrated in the drawings and described herein a plumbers' lead melting furnace, generally indicated at 10, comprises a melting pot 11, preferably formed of iron, and having a generally hemispherical configuration. Pot 11 is provided with a flange or lip 11a about the upper marginal edge thereof and is supported by a frusto-conical, tubular sheet metal shroud 14 in spaced relation to an infra-red energy generating gas burner, generally indicated at 15. Burner 15, described more fully hereinafter, comprises a generally rectangular housing 16 in the form of a hollow metal casting having laterally extending flanges 16a. Shroud 14 is conveniently formed of two segments joined by welding along vertical seams 14a and has its upper edge in snug engagement with the lip 11a and the marginal edge of pot 11, as shown, so as to provide a substantially gas tight connection therebetween. The lower edge of shroud 14 is welded o a rectangular plate 17 which has a rectangular central opening 17a and is secured by bolts 18 to the flanges 16a of burner housing 16 with a sheet metal gasket 19 interposed so as to complete a substantially gas tight connection between the shroud and the periphery of the burner.

A pair of trapezoidal sheet metal legs 20, which have inwardly directed strengthening flanges around the edges thereof, are secured by bolts 21 through the upper flanges 20a thereof to plate 17. Legs 20 are suitably braced by cross-members 20b and are spread outwardly to provide stable support for the furnace 10.

Burner housing 16 is provided with a suitable gas inlet fitting 22 to which a hose 23 is connected, the hose leading to a suitable low pressure source of gaseous fuel, in this instance a conventional LP gas tank or bottle 24 fitted with a suitable pressure reducing valve 25 and control valve 26.

Burner 15, which is preferably of a type disclosed in U.S. Pat. No. 2,775,294, comprises a foraminous element 28 of refractory material mounted in housing 16 and presenting an upper surface 28b in opening 17a of plate 17. Element 28 has a plurality of minute passages 28a through which a combustible gas-air mixture may flow from the interior of housing 16 for burning in the outer zone of the passages and immediately adjacent the upper or outer surface 28b. The combustion heats the outer surface 28b of refractory element 28 causing it to produce infra-red energy, and the combustion is completed close to the surface of the element, that is to say within a mere fraction of the distance between burner element surface 28b and the pot, so that the pot is free from direct contact with the flame and is heated evenly over substantially the entire outer surface thereof by infra-red emanations from the element. A more complete understanding of the construction and operation of the burner 15 itself may be had by reference to the above mentioned U.S. Pat. No. 2,775,294.

Figure 3:
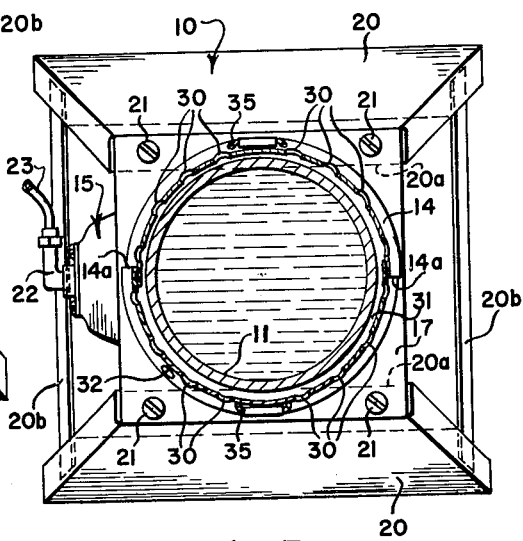
FIG. 3 is a horizontal sectional view taken along line 3—3 of FIG. 1.
Figure 2:
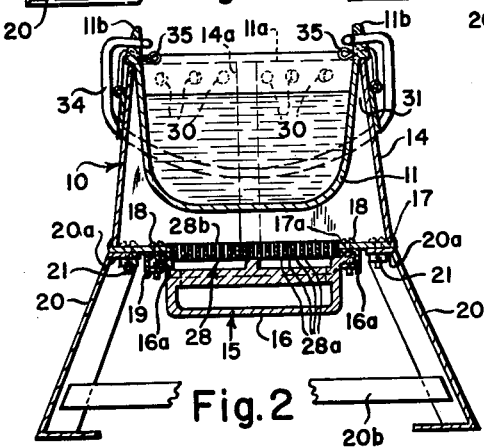
FIG. 2 is a vertical sectional view taken along line 2—2 of FIG. 1.

Shroud 14 is provided with a series of openings 30 there-about which communicate with a narrow annular space 31 defined between the upper portion of shroud 14 and the pot 11 as is best illustrated in FIGS. 2 and 3, the openings providing vents for exiting of the burned gases. Openings 30 are of such a size as to somewhat restrict the outward flow of burned gases so that a slight back-pressure is created within the shroud whereby the hot, burned gases aid in the even distribution of heat over the surface of the pot.

In practice, it has been found that for a melting pot of eight inches in diameter, a size commonly used in plumbers' furnaces, an infra-red burner 15 of the type described and having a heating capacity in the order of 12,000 b.t.u. will melt and maintain a charge of lead in the pot 11 in a usable molten state. The normal cross-sectional area of a flue opening for a heater of this capacity is about two square inches. In order to maintain the mentioned slight back pressure inside shroud 14 during use of the furnace, openings 30 aggregating about 1.75 sq. inches are provided about the top portion of the shroud. This is best accomplished by providing sixteen such openings of approximately 3/8 inch diameter evenly spaced about the shroud. A match hole 32 is provided near the lower edge of shroud 14 for ease in igniting the furnace, this hole being limited to about ½ inch in diameter so as not to destroy the mentioned back-pressure in the shroud. Because the heat generated in the pot through absorption of infra-red energy is evenly distributed, the pot remains free of hot spots and the temperature of the pot may be easily adjusted to maintain the lead in its molten state without boiling of any portion thereof, thereby minimizing agitation and excessive oxidation of the lead. Accordingly, a substantial saving is effected in the amount of lead consumed or contaminated by the presence of lead oxide.

The efficiency of the above described furnace 10 of this invention is such that the rate of fuel consumption is approximately one fourth that of the conventional blow torch type furnace operated under similar circumstances. Moreover, the furnace 10 is notably quiet in operation, because the burner operates on fuel supplied at a low pressure, such as 4 to 16 inches of water, and is mixed with air within the burner housing 16, so that the flame at the surface of refractory element 28 is docile and quiet. In addition, the shroud 14 acts as a noise reducing muffler, as a shield against cold drafts, and as a guard against the inadvertant starting of fires, the latter being an important factor inasmuch as the use of lead melting apparatus is largely confined to building construction jobs where scraps of combustible building materials are often lying about.

Because flame never touches the melting pot, and because the pot is heated evenly by absorbing infra-red energy, there is no particular tendency for the pot itself to burn or oxidize even though the quantity of lead therein is small or non-existant, thereby eleminating the frequent replacement of the pot required in the prior art devices.

Pot 11 preferably comprises aperatured ears 11b for pivotally receiving the ends of a carrying bale 34. A pair of clamps in the form of pivoted spring wire hook members 35 are conveniently pivoted to the side walls of shroud 14, as shown, and serve to releaseably clamp the pot 11 to the shroud so that the entire apparatus 10 may be carried as a portable unit by the bale 34.

From the foregoing detailed description of a preferred form of plumbers' lead melting furnace embodying the present invention it will be appreciated that there has been provided thereby a particularly compact, efficient, quiet, and durable apparatus which is capable of melting and maintaining lead in a molten condition without boiling thereof, thereby preventing waste of lead through excessive oxidation. It will also be appreciated that the lead melting apparatus of this invention provides additional substantial savings in fuel and prolongs the useful life of the melting pot forming a part thereof.

Although the present invention has been described in considerable detail and with reference to a specific form of lead melting apparatus embodying the invention, it will be understood that the invention is not limited thereto, but rather the invention includes all those modifications, changes, and adaptations as are reasonably embraced by the scope of the claims hereof.

Having thus described my invention, I claim:

A plumbers' lead melting furnace comprising a base structure including a plate-like base member, leg means attached to the edge portions of said base member for supporting said base member above and substantially parallel to a support surface on which said legs may rest, said base member having a relatively large central opening therethrough, a fuel burning radiant type heater attached to the underside of said base member and closing said opening and having the heat radiating surface thereof in said opening, a tubular shroud member attached to said base member with one end thereof in substantially gas tight engagement with said base member and encompassing said opening through said base member, said shroud extending upwardly from said base member and gradually tapering inwardly at the outer end and presenting a circular upwardly facing opening, said shroud member having a series of circumferentially spaced openings adjacent the outer edges thereof, and a pot removably positioned in said upwardly facing opening and having a flange about the upper edge thereof resting on the outer end edge of said shroud, said pot having a progessively reduced diameter toward the bottom wall thereof, the bottom wall of said pot being appreciably spaced from said heater.

References Cited in the file of this patent
UNITED STATES PATENTS

| | | |
|---|---|---|
| 1,734,747 | Seeley | Nov. 5, 1929 |
| 2,775,294 | Schwank | Dec. 25, 1956 |
| 2,832,331 | Schwank | Apr. 29, 1958 |